Sept. 2, 1924. 1,507,133
G. E. LOEBLE
EGG CRATE
Filed Oct. 4, 1921
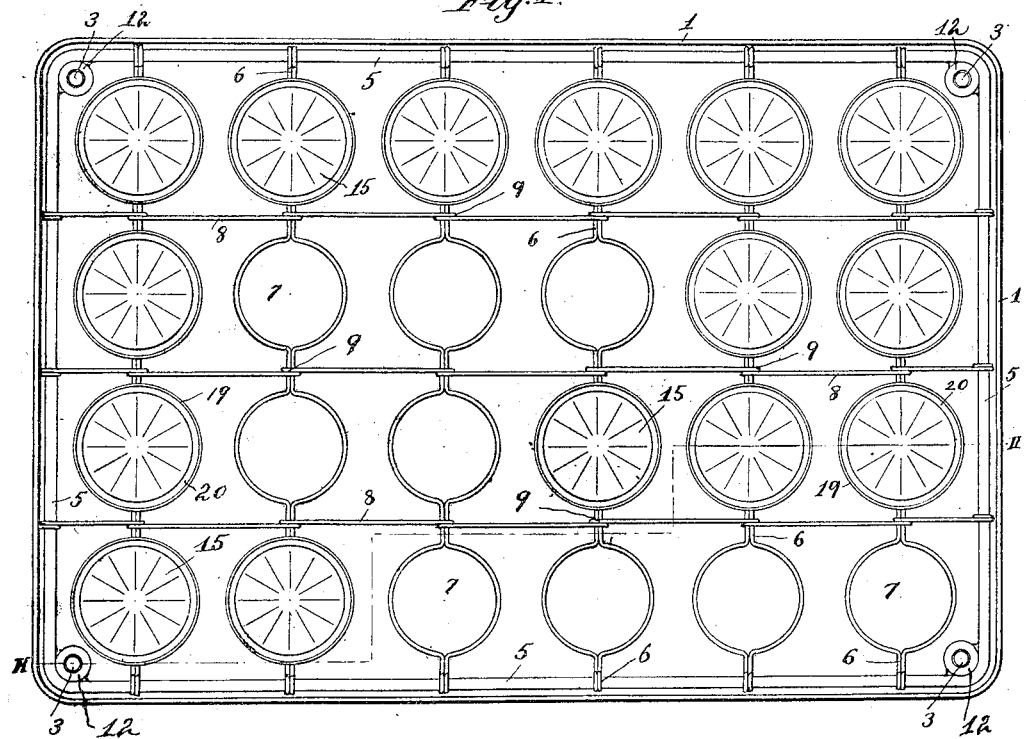
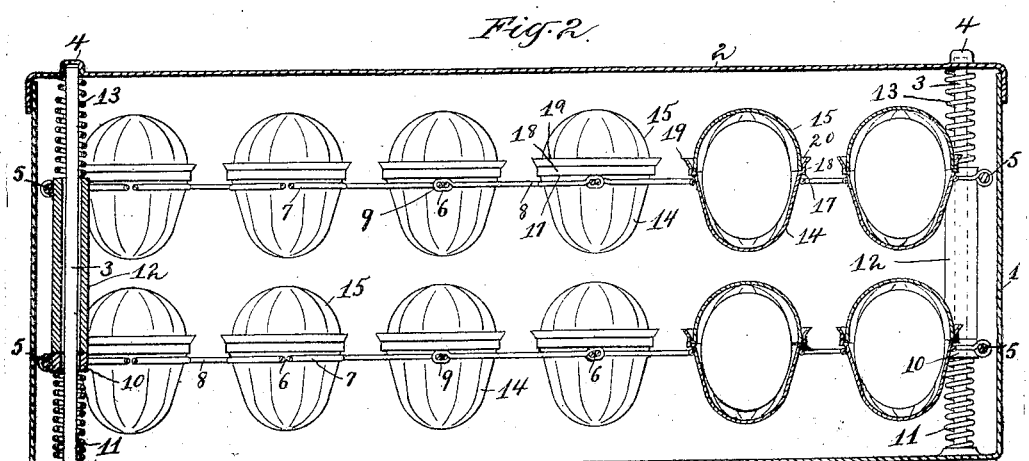
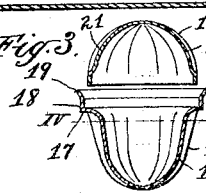 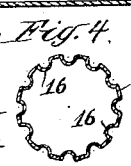 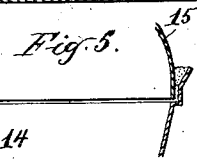

Patented Sept. 2, 1924.

1,507,133

UNITED STATES PATENT OFFICE.

GOTTLOB E. LOEBLE, OF BROOKLYN, NEW YORK.

EGG CRATE.

Application filed October 4, 1921. Serial No. 505,349.

*To all whom it may concern:*

Be it known that I, GOTTLOB E. LOEBLE, a citizen of the United States, residing in the city of New York, borough of Brooklyn, in the county of Kings and State of New York, have invented a certain new and useful Improvement in Egg Crates, of which the following is a specification.

The invention relates to receptacles in which eggs may be transported, with provisions for supporting them yieldingly to avoid breakage in transit, and the object of the invention is to provide an inclosing case with means for supporting yieldingly a series of superposed trays each adapted to carry a plurality of eggs mounted therein. Another object is to provide means whereby the trays are themselves rendered resilient, and a further object is to provide means for cushioning each egg independently in such trays.

Another object is to provide such independent cushioning means in such manner as to inclose the egg completely and to seal it from the air if desired.

The invention consists in certain novel features and details of construction and arrangement by which the above objects are attained, to be hereinafter described and claimed.

The accompanying drawings form a part of this specification and show an approved form of the invention.

Figure 1 is a plan view of the egg case with the lid removed and the uppermost tray partly filled.

Figure 2 is a vertical section through the case and cover, taken on the line II—II in Figure 1, and partly in elevation.

Figure 3 is a vertical section through one of the individual egg cups and cover, the latter shown as separated from the cup.

Figure 4 is a horizontal section through the cup on the line IV—IV in Figure 3.

Figure 5 is a section on a larger scale, through portions of the cup and cover on the line of junction, showing the manner of sealing the joint.

Similar reference numerals indicate the same parts in all the figures.

Referring to the drawings, 1 is a rectangular receptacle, preferably of sheet metal, open at the top and having a flanged lid 2 adapted to match thereon and which may be understood as hinged thereto.

In each corner of the receptacle 1 is a rod or standard 3 fastened to the bottom, with its upper end extending vertically slightly above the upper edge of the receptacle and received in a recess formed by the hollow boss 4 on the lid, when the latter is closed.

The eggs are carried in openwork rectangular trays slightly smaller than the receptacle, each shown as composed of a heavy marginal wire 5 having transversely arranged double wires 6 extending from side to side, soldered at their ends to the marginal wire, and separated or spread at intervals to form open circular loops 7. Between each loop and the next in the several series thus formed, is a tie wire 8 extending from end to end and secured to the marginal wire at its ends, and is looped tightly about the double wires at each intersection 9, thus lightly stiffening the tray and holding the loops 7 while permitting a degree of expansion in each.

In the angles at the corners of the lower tray are soldered rings 10, each adapted to slide loosely on one of the standards 3 and serve as an upper abutment for a helical spring 11 inclosing the lower end of the standard, and in the angles of the upper tray are fastened downwardly extending sleeves 12 each arranged to inclose its standard loosely and to rest upon the ring 10 below, thus supporting the upper tray at the required distance above the lower.

Above the sleeves 12 the upper ends of the standards 3 are inclosed in helical springs 13 abutting at one end against the sleeves 12 and at the other against the lid 2.

Thus arranged, the eggs lightly held in the loops 7 are yieldingly supported by the springs 11 below and springs 13 above and protected against breakage due to shocks or jars to which the receptacle may be subjected.

In the complete form of the invention each egg is also independently protected and cushioned in addition to the yielding qualities offered by the resilient trays and their supporting springs. As shown, this comprises a cup 14 and cover 15 each of a single piece of paraffine paper or the like, in which each egg is inclosed before its introduction to the tray.

The cup 14 is corrugated to form yielding vertically extending internal ridges 16 and to give the cup an approximately semiovoidal shape to conform to the egg, and each is provided with an annular outwardly projecting ledge 17 adapted to rest upon the wires forming the loop 7 of the tray. From the ledge 17 the paper extends vertically to produce a narrow annular band 18 and thence outwardly as an angular flange 19 to provide an annular channel 20 about the lower margin of the cover 15. The latter is corrugated as at 21 and is approximately hemispherical with its lower margin cylindrical and adapted to fit snugly within the annular band 18 of the cup.

The inclosed egg is thus supported and held on the yielding corrugations of the cup and cover and further insured against breakage. In the event of such breakage the contents of the egg is retained in the cup and cover and may be used for cooking purposes, with the further advantage that such contents is held against soiling adjacent cups and the trays or other portions of the interior of the receptacle.

If preferred the cups may be sealed by supplying melted paraffine to the channel 20 as shown in Figure 5. Thus sealed the eggs may be preserved for long periods, either in the receptacle shown or otherwise packed for storage.

Although only one upper tray having sleeves 12 is shown, it will be understood that a plurality of such trays may be superposed in a receptacle of corresponding depth, and the entire series cushioned by the springs 11 and 13.

It will be noted that the trays formed as shown offer a resilient yielding support for the series of egg cups; that the trays are spring supported and thus cushioned; and that the cups themselves by reason of their corrugations afford additional yielding supports for the egg.

I claim:—

1. A receptacle having vertical standards, a lower tray having at each corner means loosely guided thereby, means to support said tray yieldingly, an upper tray having means loosely guided by said standards, a lid adapted to be supported by said standards, and yielding means at each corner between the lid and upper tray.

2. A receptacle having vertically extended standards therein, a lower tray having rings each loosely inclosing one of said standards, a spring on each of said standards arranged to support said tray yieldingly, an upper tray having sleeves each loosely inclosing one of said standards and adapted to rest upon said lower tray, a lid for said receptacle adapted to engage the upper ends of said standards, and a spring on each of said standards between said lid and upper tray.

In testimony that I claim the invention above set forth I affix my signature.

GOTTLOB E. LOEBLE.